Jan. 9, 1968  G. E. THIELE  3,362,552
COMBINED DUMP AND ELEVATE TRUCK CHASSIS MECHANISM
FOR CHANGEABLE BODIES
Filed Oct. 27, 1965  4 Sheets-Sheet 2

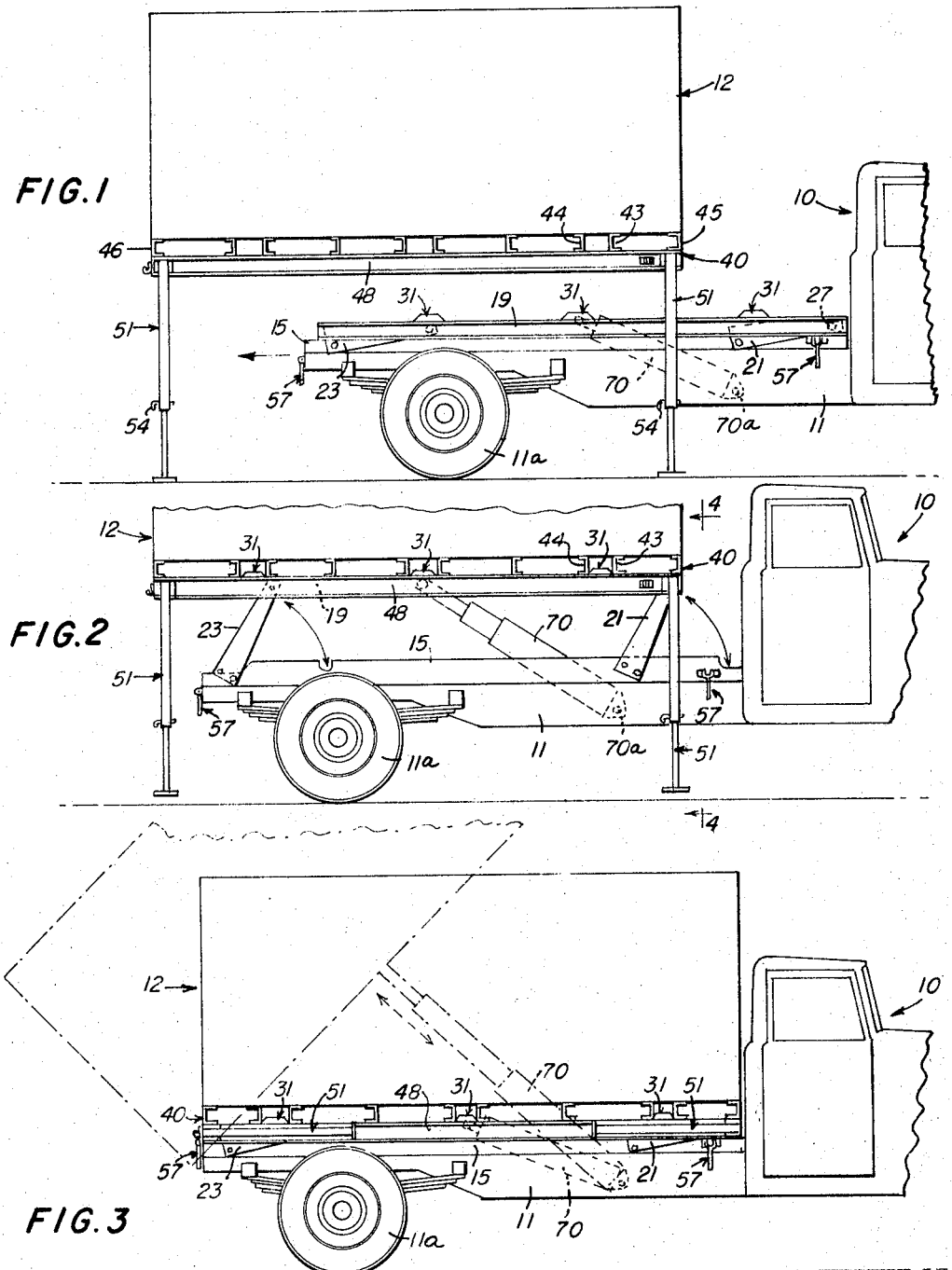

INVENTOR
GLENN EDWARD THIELE

BY *Beall and Jones*
ATTORNEYS

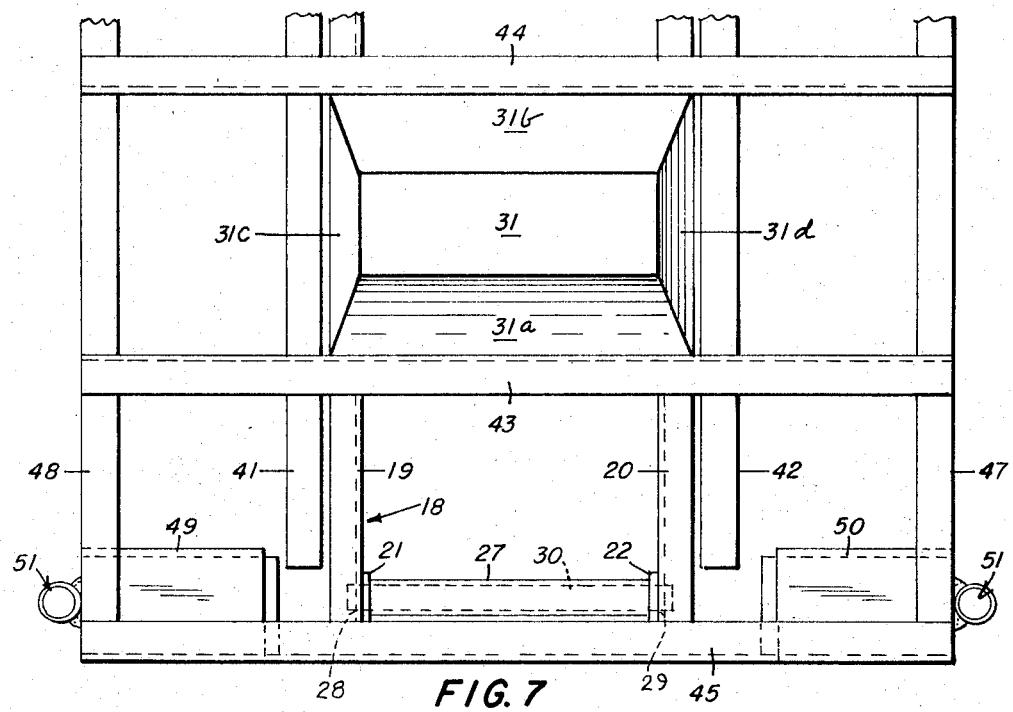
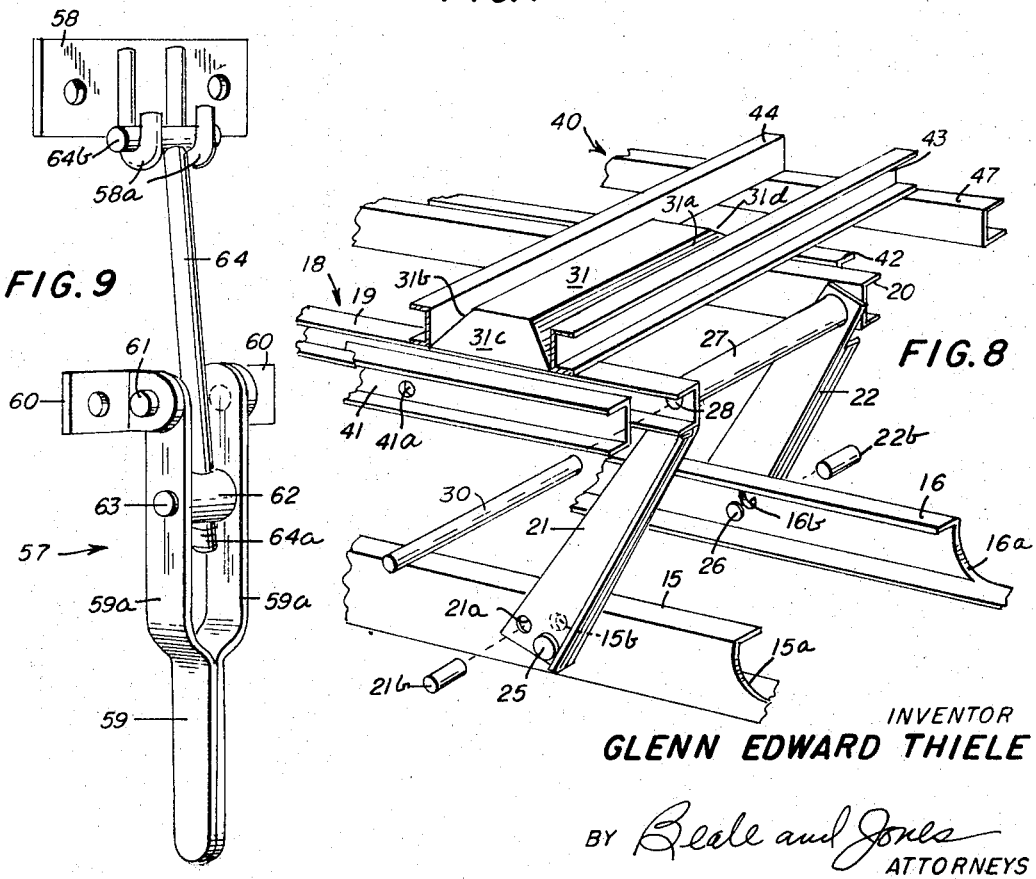

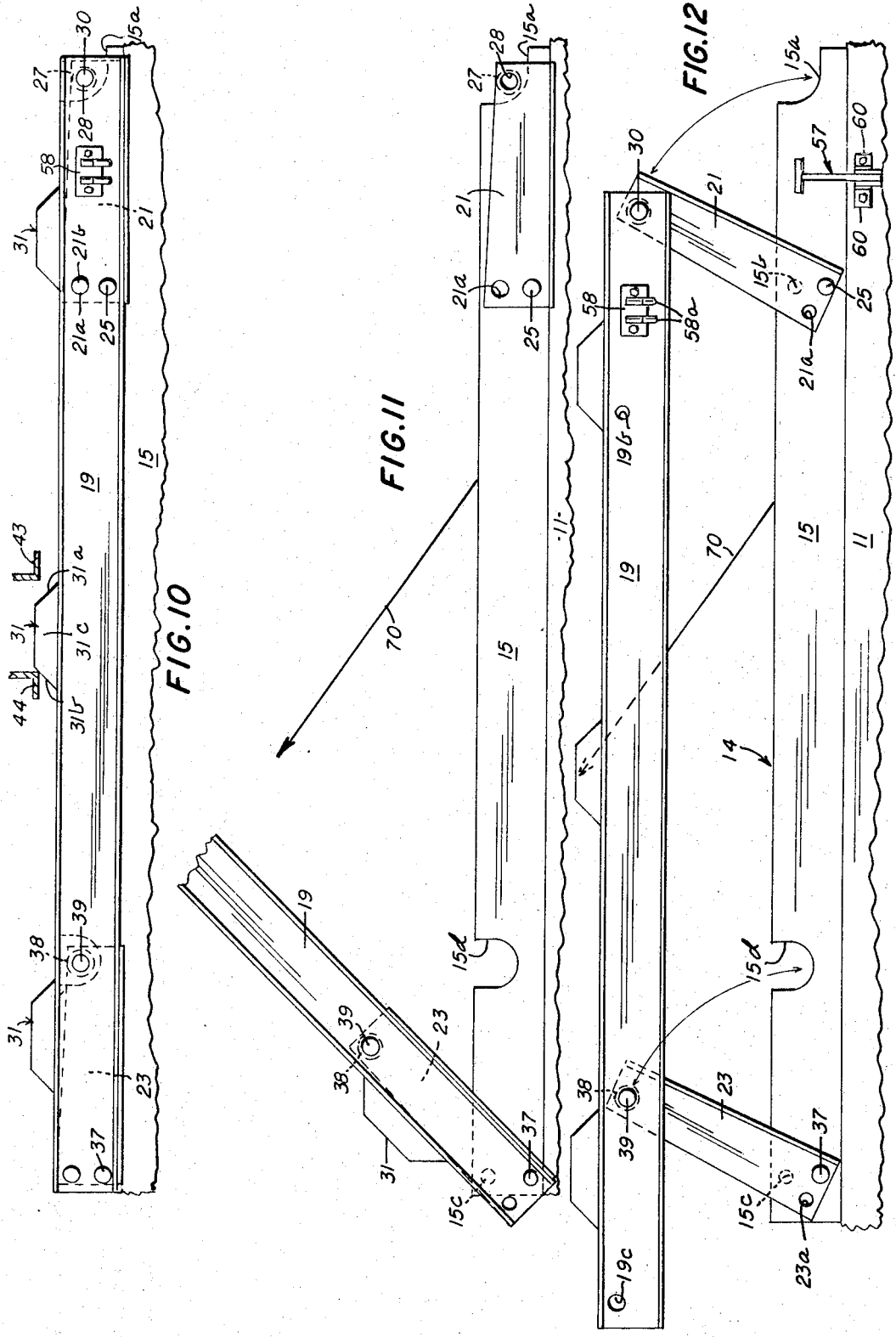

United States Patent Office

3,362,552
Patented Jan. 9, 1968

3,362,552
COMBINED DUMP AND ELEVATE TRUCK
CHASSIS MECHANISM FOR CHANGEABLE
BODIES
Glenn Edward Thiele, Windber, Pa., assignor to Thiele,
Inc., Windber, Pa., a corporation of Pennsylvania
Filed Oct. 27, 1965, Ser. No. 505,389
10 Claims. (Cl. 214—501)

ABSTRACT OF THE DISCLOSURE

A support for mounting on a vehicle to accommodate various types of changeable bodies, the support has a first frame for attachment to the vehicle and a second frame to receive a vehicle body and pivoted to the first frame at the front and back, the front pivots being selectively removable permitting the second frame to pivot about its back pivots to tilt a carried dump body. There is a power cylinder for elevating and tilting the second frame. The second frame has guides that cooperate with guide portions on the body to properly orient the body on the second frame. The bodies are equipped with detachable supports to support the same when removed from the second frame.

---

This invention is directed to improvements in a truck type of vehicle having combined dump and elevating mechanism providing for the use of changeable bodies.

An object of the invention is to provide lift mechanism and dump mechanism for a truck chassis so that various types of bodies may be easily mounted and dismounted.

A further object of the invention is to provide an elevating mechanism that will elevate a detachable body parallel to the chassis frame to permit stationary supports to be placed under the body so that the elevating mechanism may be depressed to normal position and the truck moved out from under the body.

A still further object of the invention is to provide an elevating mechanism for a truck chassis that permits installation of a removable dump body whereby minor adjustment of the parallel elevating mechanism permits elevating solely about a rear pivot to dump the load from the body.

Yet a still further object of the invention is to provide a lift apparatus that is compact and permits storage of the movable parts so as to not increase the height above the normal truck chassis more than a minimum amount yet provides a sturdy and strong elevating mechanism.

A further object of the invention is to provide hoist apparatus for removable bodies that has guide means thereon for guiding the body into seating position on a hoist mechanism.

A still further object of the invention is to provide lift apparatus utilizing a common power cylinder or means for elevating the support apparatus so as to support a body for receipt and removal and adapted to elevate the apparatus in a dumping position for a dump body being used.

A further object of the invention is to provide not only a dump truck, but also a unit that can be equipped with removable bodies of all types; such as van bodies, horse vans, manure spreaders, cinder spreaders, hay bodies and practically any type of a truck body that may be desired as well as a camper body.

Still further objects and the entire scope of applicability of the present invention will become apparent from the detailed description given hereinafter. It is to be understood, however, that the detailed description and specific example is given by way of illustration only and, while indicating preferred embodiments of the invention, is not given by way of limitation, since various changes and modifications within the sphere and scope of the invention will become apparent to those skilled in the art from this detailed description.

For a more complete understanding of the nature and scope of the invention reference is had to the following description and claims which follow and in which in the attached drawings the figures are described as follows:

FIG. 1 is a side elevation of the apparatus with the truck chassis backed partially under a removable body held on stationary supports;

FIG. 2 in a view similar to FIG. 1 with the truck chassis having the elevating mechanism elevated in a position underneath the body and elevated so as to move the stationary supports just off the ground for clearance;

FIG. 3 is a view of the truck chassis with the lift support means mounted thereon and a body in supported position, the broken lines show a dumping position for the body;

FIG. 7 is a fragmentary top plan view along line 7—7 of FIG. 4;

FIG. 8 is a perspective exploded view of the forward ends of the support frames in an elevated position;

FIG. 9 is a perspective view of a toggle clamp for holding a body on a chassis;

FIG. 10 is a side elevation of the support frames in fully retracted position mounted on a chassis shown in fragmentary manner;

FIG. 11 is a view of the support frames of FIG. 10 in an elevated position about the rear pivot; and FIG. 12 is a view of the support frames of FIG. 10 with the lift frame thereof elevated in parallel position.

Throughout the description like reference numbers refer to similar parts.

Figure 4:
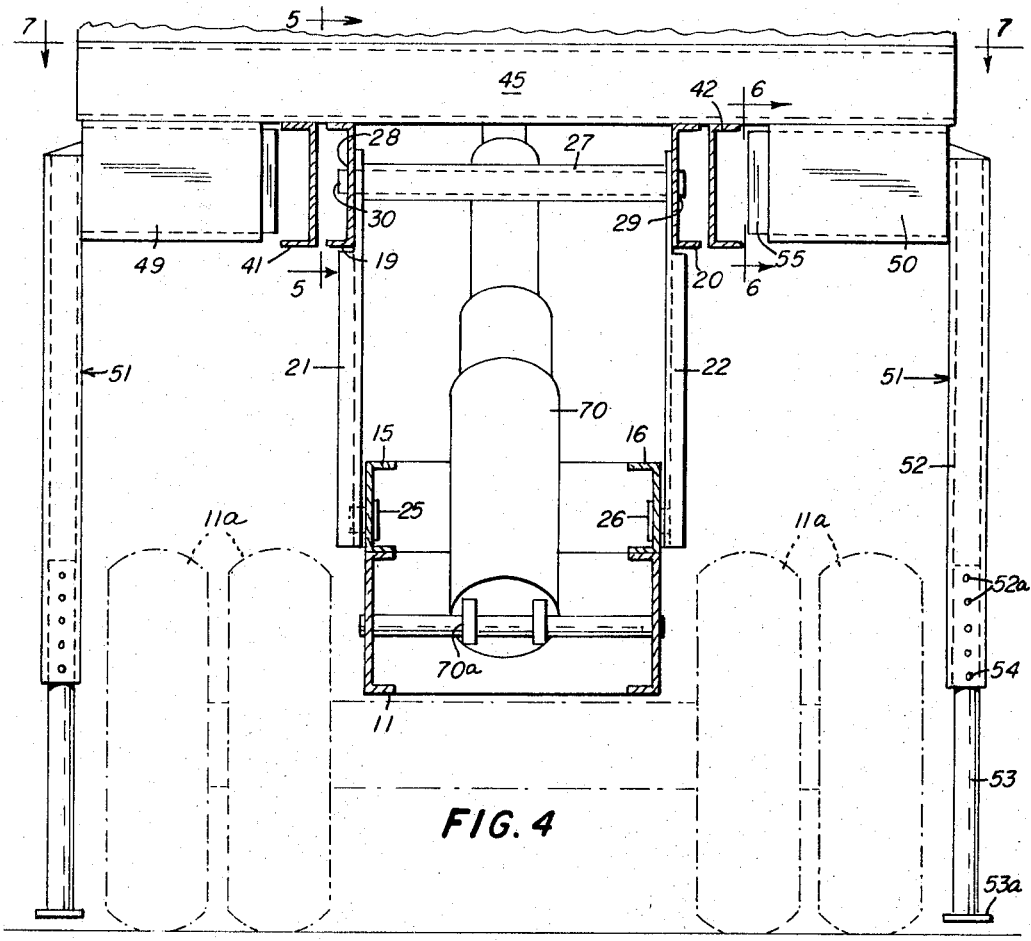
FIG. 4 is a view along line 4—4 of FIG. 2 on an enlarged scale.
Figure 5:
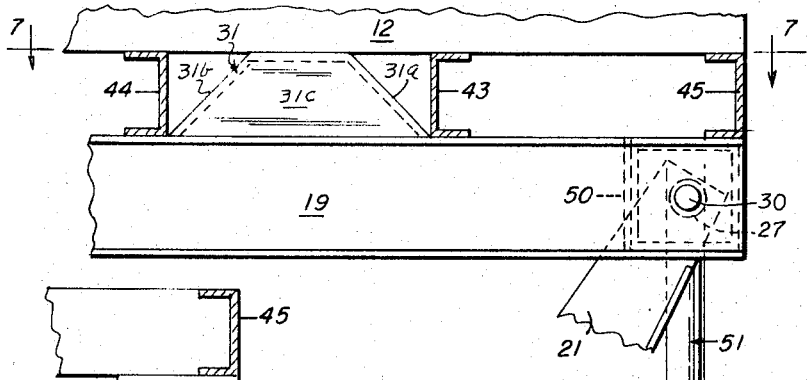
FIG. 5 is a sectional view along 5—5 of FIG. 4.
Figure 6:
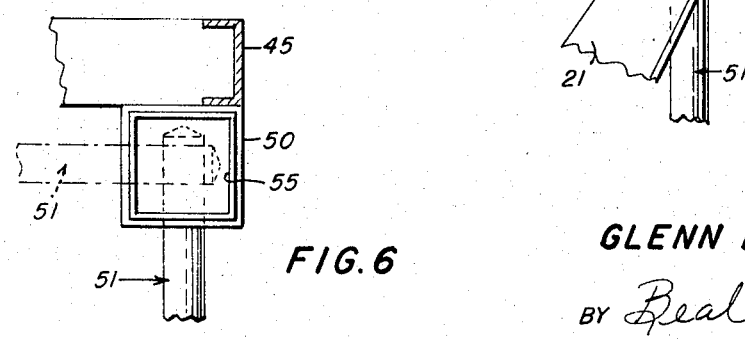
FIG. 6 is a fragmentary view along 6—6 of FIG. 4 showing a body support and its mounting in a socket on the body frame.

A typical truck is indicated at 10 having a chassis 11 and rear wheels 11a. A vehicle body 12 is provided with a support framework 40 which will be described hereinafter.

Reference to FIG. 8 shows a lower support frame generally indicated at 14 made up of right hand member 15 and left hand member 16, both of which are longitudinally extending members, and each has a cut out arcuate portion 15a and 16a at its forward end to nest and receive a tubular member on a second or lift frame 18 as will be explained later. Each of these channel members have forward locking pin apertures 15b and 16b and rearward locking pin apertures 15c and 16c, see FIG. 12, the purpose of which will be explained later. Each of these channel members 15 and 16 also have rear cut out arcuate portions 15d and 16d which serve the same purpose as the cut out portions 15a and 16a in the forward part to receive a transverse tubular member on second or lift frame 18 which will be explained.

A second, or lift, frame 18 is a part of the movable support means for the removable bodies and comprises longitudinal channel members 19 and 20. The forward ends of the channel members 19 and 20 are supported by lift arms 21 and 22 having pivot connections at 25 and 26 on the respective longitudinal members 15 and 16. Each of the lift arms 21 and 22 have locking pin holes 21a and 22a to line up with the locking pin holes 15b and 16b respectively in the longitudinal members 15 and 16. There is a pair of rear lift arms 23 and 24, see FIG. 12, supporting the rear end of the lift frame members 19 and 20 on the rear ends of the longitudinal members 15 and 16 by means of the pivot pins such as 37 for arm 23 attaching it to the rear end portion of first frame member 15 while the upper ends of the respective lift arms are connected by a transverse tubular member 38 which is in turn pivotally connected to the longitudinal channel 19 and 20 by a pivot pin 39.

The forward lift arms 21 and 22 have at their tops a transverse tubular connecting member 27. There is an aperture 28 in the forward end of longitudinal member 19 and an aperture 29 in the forward end of longitudinal member 20 which are in alignment with the tubular member 27 so as to receive a removable top pin or pivot pin 30. Thus, the forward ends of the longitudinal members 19 and 20 may be cast loose from the upper ends of the lift arms 21 and 22. This occurs when the lift members, or the second frame members, are used to raise a dump box or body into a dumping position. The tubular member 38 that extends across the upper ends of arms 23 and 24 has a non-removable pivot pin 39. It is equally possible to have the lower pivot pins 25 and 26 removable so that either they may be removed or the upper pivot pin 30 may be removed to permit the lift frame 18 to pivot about the rear pivots for raising and lowering a dump body when installed.

Mounted on the top of the longitudinal members 19 and 20 are transfer spacers or guides 31 which are spaced in a longitudinal direction. These spacers or guides 31 have forward and rear faces 31a and 31b slanting upwardly and inwardly and end faces 31c and 31d, see FIG. 7, slanting upwardly and inwardly so as to guide into position certain elements on the body to be received on the lift frame 18.

Each typed body 12 has a body frame portion 40 which has a right center longitudinal channel member 41 and a left center longitudinal channel member 42, see FIG. 7. Each of these channel members 41 and 42 have locking pin apertures 41a and 41b respectively which line up with the apertures 21a in lift arm 21 and 15b in member 15 on one side and corresponding apertures on the lift arm 22 and the aperture 16b on the left longitudinal member 16. Forward and rear channel members 43 and 44, respectively, extend transversely across the body frame in spaced apart longitudinal direction and form a pair of guide members cooperating with each transverse spacing or guiding member 31. The longitudinal channel members 41 and 42 cooperate with the slanting end faces 31c and 31d, respectively, of this spacer 31 while the transverse members 43 and 44 cooperate with and are guided in place by the upwardly and inwardly extending faces 31a and 31b, respectively, on the spacer 31.

The frame 40 of each body has an extreme forward transverse channel member 45, see FIGS. 1 and 7, and an extreme rear cross channel member 46 while the extreme sides of the frame 40 are formed by channel members 47 and 48. At each forward corner is a square socket built-up member 49 at the right front and 50 at the left front while similar socket members are provided in the rear. These socket members serve to receive a suitable support generally indicated at 51, which will be described. These adjustable stationary supports 51 for the body have an upper tubular portion 52 having spaced apertures 52a at its lower end to telescopically receive a member 53 having a foot pad 53a for engagement with the ground. A removable pin 54 secures member 53 to the tubular member 52 in suitable adjustable position. The upper end of the support 51 has a transverse built-up box-shaped member 55 welded thereto for receipt in the socket 50, like socket members and adjustable supports 51 are provided for each corner of the frame 40 for the body.

Reference to FIG. 9 shows a toggle clamp 57 for holding the body frame 40 to the chassis 11. A fixed receiver 58 is attached to a body frame member and it is provided with U-shaped open jaws 58a. Attached to the chassis are L-shaped clips 60 having pivot apertures for securing a hand operable lever 59. The lever 59 has bifurcated ends 59a which are attached by the pivot pins 61 to the clips 60. A threaded socket 62 is pivotally mounted by pivot pins 63 between the bifurcations 59a of the handle 59. An over center draw rod 64 threaded at its lower end 64a is threadedly received within the threaded socket 62 that is held by the pivot pins 63. The upper end of the over center or draw rod 64 has a transverse member 64b that is received within the jaws 58a of the fixed member attached to the frame 40. Thus, by manipulation of the over center member 59 and the proper adjustment of the draw bar 64 in the threaded socket 62, the body frame 40 is held secured to the chassis, but is easily unfastened.

In FIG. 10 the compact, low profile of the support frames 14 and 18 is shown with the longitudinal frame member 19 of the first frame 14 facing the viewer. The spacer or guide members 51 are shown and the transverse members on the body frame 43 and 44 are shown being guided into position. The forward locking pins 21b and 22b for the forward arms 21 and 22 and similar locking pins for the rear arms 23 and 24 are removed when a lift or body change is to be made. The removable pivot pin 30 is also removed when the dump body is to be used wherein the second or lift frame generally indicated at 18 is pivoted by a hydraulic lift 70, see FIG. 4 about the rear pivots 37. This hydraulic lift serves to pivot the lift frame 18 about the rear pivots 37. In FIG. 11 this is illustrated for a dumping position wherein the hydraulic lift would elevate the lift frame 18 to about 45°.

In FIG. 12 with the forward pivot pin 30 in place the forward lift arms 21 and 22 and the rear lift arms 23 and 24 are utilized to move the lift frame 18 up about 14 inches parallel to the first frame 14 and this is illustrated in FIG. 2 of the drawings. The hydraulic hoist 70 is fastened at one end to the lift frame assembly 18 while the other end of the lift hoist is pivotally attached at 70a to the chassis 11.

Many types of bodies provided with a base frame such as 40 may be utilized with this unique lift and support arrangement mounted on the truck chassis. The same lift and support apparatus may be used as pointed out as a dump body support and dumping mechanism making a highly useful adaptation for an automobile truck.

I claim as my invention:

1. A changeable vehicle body assembly comprising, in combination:

a first frame means mountable on a vehicle chassis and having a pair of spaced apart longitudinal members;

a second frame means having a pair of spaced apart longitudinal members each positionable along a respective longitudinal member of said first frame means;

a forward pair of lift arms pivotally connected at their lower ends to the forward ends of the first frame means by pivot means and pivotally connected at their upper ends to the forward ends of the second frame means by pivot means, at least one pivotal connecting means on each lift arm being readily removable;

a rear pair of lift arms pivotally connected at their lower ends to the rear ends of the first frame means and pivotally connected at their upper ends to the rear ends of the second frame means, said lift arms pivotally positioning said second frame means in a generally parallel attitude to the first frame means and said forward pair of lift arms being parallel to the rear pair of lift arms;

a power lift means directly connected to said second frame means and connectable to said vehicle to move said second frame means up and down with respect to said first frame means in a generally parallel attitude when said removable pivot means of the forward pair of lift means is in place;

said power lift means on removal of said removable pivot means from said forward pair of lift arms pivoting said second frame means simultaneously while in alignment with said rear pair of lift arms about the rear lift arms pivotal connection with said first frame means;

and a vehicle body means received on said second frame means and having independent support means for supporting the same when said independent support means are in supporting position on retraction and lowering of said second frame means from an elevated generally parallel position above said first frame means whereby to separate the vehicle body for a replacement.

2. A changeable body assembly comprising, in combination:

a first frame means mountable on a vehicle chassis;
a second frame means for cooperation with said first frame means and normally positioned thereadjacent and movable upward therefrom;
a forward pair of lift arms pivotally connected at their upper ends to the forward end of the second frame means by pivot means and at their lower ends pivotally connected to the forward ends of the first frame means by pivot means;
said pivot means at one of said ends of the forward pair of lift arms being selectively removable;
a rear pair of lift arms pivotally connected at their lower ends to the rear end of the first frame means and pivotally connected at their upper ends to the rear end of the second frame means;
said lift arms pivotally positioning said second frame means in a generally parallel attitude to the first frame means;
a power lift means connected to said second frame means and adapted to be connected to the vehicle to move said second frame means up and down with respect to said first frame means in a generally parallel attitude and said forward pair of lift arms being generally parallel to the rear pair of lift arms when said removable pivot means of the forward pair of lift arms is in place;
said power lift means on removal of said removable pivot means from said forward pair of lift arms being adapted to pivot said second frame means simultaneously along with said rear pair of lift arms about the rear lift arms pivotal connection with said first frame means;
and a vehicle body means received on said second frame means and having support means for independently supporting the body on retraction and lowering of said second frame means from an elevated generally parallel position above said first frame means whereby to remove the vehicle body for receiving a replacement.

3. A changeable body assembly according to claim 2 wherein:
said first and second frame means have a pair of spaced apart longitudinal members to which said lift arms are pivotally connected.

4. A changeable body assembly according to claim 2 wherein said first and second frame means have a pair of spaced apart longitudinal members to which said lift arms are pivotally attached and said longitudinal members of the second frame means nest respectively outside the longitudinal members of the first frame means.

5. A changeable body assembly according to claim 2 wherein said means for independently supporting the vehicle body comprise adjustable in length elongated members having transversely extending box-like frames at their upper ends receivable in a nonrotary manner in sockets provided on said vehicle body.

6. A changeable body assembly according to claim 2 wherein said second frame means has aligning means for positioning the body member with respect thereto and said body member has aligning means cooperating with said aligning means on the second frame means.

7. A changeable body assembly according to claim 6 wherein said aligning means on the second frame member comprise rearwardly and forwardly slanting plate surfaces extending transverse of the second frame means and upwardly and inwardly slanting plate surfaces extending in a forward and rearward direction and joining at each end of said rearwardly and forwardly slanting plate surfaces and wherein said aligning means on the bottom of the body member comprise transversely extending spaced apart vertical plates for cooperation with the transverse aligning surfaces of the second frame member and longitudinal spaced apart members supporting said transversely extending vertical plates for cooperative alignment by said upwardly and inwardly slanting plate surfaces on the second frame means.

8. A changeable body assembly comprising, in combination:

a first frame means mountable on a vehicle chassis;
a second frame means for cooperation with said first frame means and normally positioned thereadjacent and movable upward therefrom;
a forward pair of lift arms pivotally connected at their upper ends to the second frame means by pivot means and at their lower ends pivotally connected to the first frame means by pivot means;
said pivot means at one of said ends of the forward pair of lift arms being selectively removable;
a rear pair of lift arms pivotally connected at their lower ends to the first frame means and pivotally connected at their upper ends to the second frame means;
said lift arms pivotally positioning said second frame means in a generally parallel attitude to the first frame means;
a power lift means connected to said second frame means and adapted to be connected to the vehicle to move said second frame means up and down with respect to said first frame means in a generally parallel attitude when said removable pivot means of the forward pair of lift arms is in place;
said power lift means on removal of said removable pivot means from said forward pair of lift arms being adapted to pivot said second frame means simultaneously along with said rear pair of lift arms about the rear lift arms pivotal connection with said first frame means;
and vehicle body means received on said second frame means and having support means for independently supporting the body on retraction and lowering of said second frame means from an elevated generally parallel position above said first frame means whereby to remove the vehicle body for receiving a replacement;
said first and second frame means having a pair of spaced apart longitudinal members to which said lift arms are pivotally attached and said longitudinal members of the second frame means nest respectively outside the longitudinal members of the first frame means;
each pair of lift arms are connected together by a transversely extending tubular member communicating with apertures in the upper ends of the lift arms and the upper edges of the longitudinal members of the first frame means have recesses therein to receive and nest said tubular members.

9. A changeable body assembly comprising, in combination:

a first frame means mountable on a vehicle chassis;
a second frame means for cooperation with said first frame means and normally positioned thereadjacent and movable upward therefrom;
a forward pair of lift arms pivotally connected at their upper ends to the second frame means by pivot means and at their lower ends pivotally connected to the first frame means by pivot means;
said pivot means at one of said ends of the forward pair of lift arms being selectively removable;
a rear pair of lift arms pivotally connected at their lower ends to the first frame means and pivotally connected at their upper ends to the second frame means;

said lift arms pivotally positioning said second frame means in a generally parallel attitude to the first frame means;

a power lift means connected to said second frame means and adapted to be connected to the vehicle to move said second frame means up and down with respect to said first frame means in a generally parallel attitude when said removable pivot means of the forward pair of lift arms is in place;

said power lift means on removal of said removable pivot means from said forward pair of lift arms being adapted to pivot said second frame means simultaneously along with said rear pair of lift arms about the rear lift arms pivotal connection with said first frame means;

and a vehicle body means received on said second frame means and having support means for independently supporting the body on retraction and lowering of said second frame means from an elevated generally parallel position above said first frame means whereby to remove the vehicle body for receiving a replacement;

means for locking said vehicle body to the second frame means and the second frame means to the first frame means;

said locking means comprising a removable pin and aligned apertures in said first and second frame means, said vehicle body and at least one pair of said lift arms for receiving said removable pin.

10. A changeable body assembly comprising, in combination:

a first frame means mountable on a vehicle chassis;

a second frame means for cooperation with said first frame means and normally positioned thereadjacent and movable upward therefrom;

a forward pair of lift arms pivotally connected at their upper ends to the second frame means by pivot means and at their lower ends pivotally connected to the first frame means by pivot means;

said pivot means at one of said ends of the forward pair of lift arms being selectively removable;

a rear pair of lift arms pivotally connected at their lower ends to the first frame means and pivotally connected at their upper ends to the second frame means;

said lift arms pivotally positioning said second frame means in a generally parallel attitude to the first frame means;

a power lift means connected to said second frame means and adapted to be connected to the vehicle to move said second frame means up and down with respect to said first frame means in a generally parallel attitude when said removable pivot means of the forward pair of lift arms is in place;

said power lift means on removal of said removable pivot means from said forward pair of lift arms being adapted to pivot said second frame means simultaneously along with said rear pair of lift arms about the rear lift arms pivotal connection with said first frame means;

and a vehicle body means received on said second frame means and having support means for independently supporting the body on retraction and lowering of said second frame means from an elevated generally parallel position above said first frame means whereby to remove the vehicle body for receiving a replacement;

said first and second frame means having a pair of spaced apart longitudinal members to which said lift arms are pivotally attached;

said longitudinal frame members nesting with one frame means inside the other frame means;

each pair of lift arms are connected together by a transversely extending tubular member communicating with apertures in the upper ends of the lift arms and the upper edges of the longitudinal members of the inside nesting frame means have recesses therein to receive therein said tubular members.

References Cited

UNITED STATES PATENTS

| | | | |
|---|---|---|---|
| 1,985,169 | 12/1934 | Howell et al. | 214—502 |
| 2,251,839 | 8/1941 | Dondlinger. | |
| 2,478,578 | 8/1949 | Gottshall | 296—35 |
| 2,527,369 | 10/1950 | Meyer. | |
| 3,119,503 | 1/1964 | Herpich et al. | 214—512 |
| 3,262,678 | 7/1966 | Hand | 214—512 X |

GERALD M. FORLENZA, *Primary Examiner.*

ALBERT J. MAKAY, *Examiner.*